US007908482B2

(12) United States Patent
Lauter et al.

(10) Patent No.: US 7,908,482 B2
(45) Date of Patent: Mar. 15, 2011

(54) KEY CONFIRMED AUTHENTICATED KEY EXCHANGE WITH DERIVED EPHEMERAL KEYS

(75) Inventors: Kristin E. Lauter, La Jolla, CA (US); Brian A. LaMacchia, Bellevue, WA (US); Anton Mityagin, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 1259 days.

(21) Appl. No.: 11/208,336

(22) Filed: Aug. 18, 2005

(65) Prior Publication Data
US 2007/0043946 A1 Feb. 22, 2007

(51) Int. Cl.
*H04L 9/32* (2006.01)
*H04L 9/00* (2006.01)
(52) U.S. Cl. ......................................... 713/171; 380/277
(58) Field of Classification Search .................. 713/171; 380/277
See application file for complete search history.

(56) References Cited

U.S. PATENT DOCUMENTS

| 6,122,736 | A | * | 9/2000 | Vanstone et al. | 713/169 |
|---|---|---|---|---|---|
| 6,226,383 | B1 | * | 5/2001 | Jablon | 380/30 |
| 6,487,661 | B2 | | 11/2002 | Vanstone et al. | |
| 6,539,479 | B1 | * | 3/2003 | Wu | 713/151 |
| 6,718,467 | B1 | * | 4/2004 | Trostle | 713/171 |
| 6,993,651 | B2 | * | 1/2006 | Wray et al. | 713/151 |
| 7,159,116 | B2 | * | 1/2007 | Moskowitz | 713/176 |
| 7,490,239 | B2 | * | 2/2009 | Beeson | 713/176 |
| 2002/0062451 | A1 | * | 5/2002 | Scheidt et al. | 713/201 |
| 2002/0090085 | A1 | * | 7/2002 | Vanstone et al. | 380/44 |
| 2003/0081785 | A1 | * | 5/2003 | Boneh et al. | 380/277 |
| 2003/0123655 | A1 | * | 7/2003 | Lambert et al. | 380/28 |
| 2004/0081321 | A1 | * | 4/2004 | Struik | 380/278 |
| 2005/0066175 | A1 | * | 3/2005 | Perlman | 713/176 |
| 2006/0093138 | A1 | * | 5/2006 | Durand et al. | 380/44 |
| 2007/0043946 | A1 | * | 2/2007 | Lauter et al. | 713/171 |

OTHER PUBLICATIONS

Law et al., "An Efficient Protocol for Authenticated Key Agreement"; Technical Report CORR 98-05, Dept. of C&O, University Waterloo, Canada, 1998; pp. 1-16, 18 pgs.
Boyd et al., "Elliptical Curve Based Password Authenticated Key Exchange Protocols", ACISP 2001, LNCS 2119, Springer-Verlag Berlin Heidelberg 2001, 2001, pp. 487-501.
Canetti et al., "Analysis of Key-Exchange Protocols and Their Use for Building Secure Channels", Proceedings of the International Conference on the Theory and Application of Cryptographic Techniques, LNCS, Springer-Verlag, vol. 2045, 2001, pp. 451-474.
Shin et al., "Leakage-Resilient Authenticated Key Establishment Protocols", Advances in Cryptology ASIACRYPT, LNCS 2894, Springer Berlin/Heidelberg, 2003, pp. 155-173.
Vanstone, "Key Argument and Transport Protocol", PCT/CA 03/00317, Mar. 8, 2002.

* cited by examiner

*Primary Examiner* — Techane J Gergiso
(74) *Attorney, Agent, or Firm* — Lee & Hayes, PLLC

(57) ABSTRACT

Key confirmed (KC) authenticated key exchange (AKE) with derived ephemeral keys protocol using a mathematical group is described. In one aspect, a first party, using the mathematical group, determines whether a second party has received information to compute an agreed session key value for exchanging information securely with the first party. At least a subset of the received information is computed using derived ephemeral keys of the first and second parties. The first party generates the agreed session key value only when the second party has demonstrated receipt of the information.

13 Claims, 7 Drawing Sheets

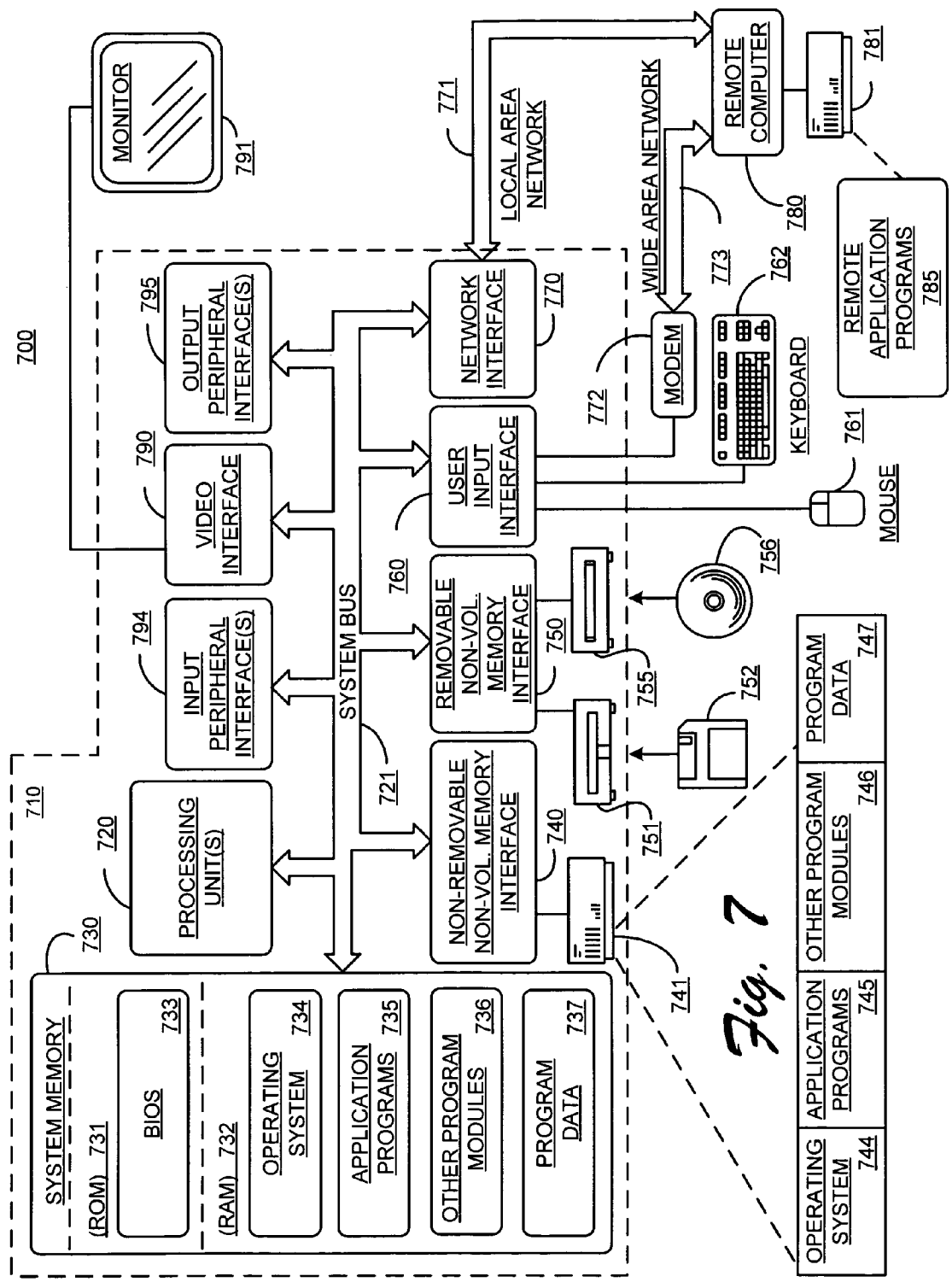

KEY CONFIRMED AUTHENTICATED KEY EXCHANGE WITH DERIVED EPHEMERAL KEYS

BACKGROUND

Many standards documents governing the use of public key cryptography include specifications for Authenticated Key Exchange (AKE). AKE protocols involve two parties, an initiator, and a responder. The goal of AKE is to allow the two parties to generate a secret session key, while authenticating the identities of the parties, so that the two parties can securely exchange information over a public channel with one another. AKE protocols such as Menezes-Qu-Vanstone (MQV) and an elliptic curve (EC) analogue (ECMQV) have recently been introduced. MQV and ECMQV are based on the well-known Diffie-Hellman key exchange protocol. The Diffie-Hellman key exchange protocol relies on the hardness of computing the discrete logarithm in a mathematical group. That is, if one takes an arbitrary number g known to everyone, picks an exponent, raises g to the power of this exponent, and announces the result, it becomes computationally infeasible for someone to determine which exponent was used.

Recent research has shown that the KEA, MQV, and ECMQV protocols are not secure against certain classes of attacks such as impersonation attacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In view of the above, key confirmed (KC) authenticated key exchange (AKE) with derived ephemeral keys is described. In one aspect, a first party, using the mathematical group, determines whether a second party has received information to compute an agreed session key value for exchanging information securely with the first party. At least a subset of the received information is computed using derived ephemeral keys of the first and second parties. The first party generates the agreed session key value only when the second party has demonstrated receipt of the information.

BRIEF DESCRIPTION OF THE DRAWINGS

In the Figures, the left-most digit of a component reference number identifies the particular Figure in which the component first appears.

FIG. 3 is a continuation of the exemplary operations shown in FIG. 2.

FIG. 4 is a continuation of the exemplary operations shown in FIGS. 2 and 3.

FIG. 5 is a continuation of the exemplary operations shown in FIGS. 2 through 4.

FIG. 6 is a continuation of the exemplary operations shown in FIGS. 2 through 5.

FIG. 7 illustrates an example of a suitable computing environment for implementing (fully or partially) KC-AKE with derived ephemeral keys, according to one embodiment.

DETAILED DESCRIPTION

Overview

KC-AKE with derived ephemeral keys protocols KEA++C and EC-KEA++C provide extensions to existing Diffie-Hellman based AKE protocols to achieve provable security against impersonation. More particularly, KEA++C provides for KC-AKE with derived ephemeral keys using a multiplicative group of a prime field, and EC-KEA++C provides for KC-AKE with derived ephemeral keys using a group of points on an elliptic curve of prime order. KEA++C and EC-KEA++C are different from conventional AKE protocols in that KEA++C and EC-KEA++C:

verify that each respective party has received enough information to generate an agreed session key value with which to establish a secure channel for exchanging information between the parties; and generate secret session key values based on the identities of the parties that are exchanging the information; and, The following sections describe these and other aspects of KC-AKE with derived ephemeral keys protocols (i.e., KEA++C and EC-KEA++C) in greater detail.

An Exemplary System

Although not required, KC-AKE with derived ephemeral keys is described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
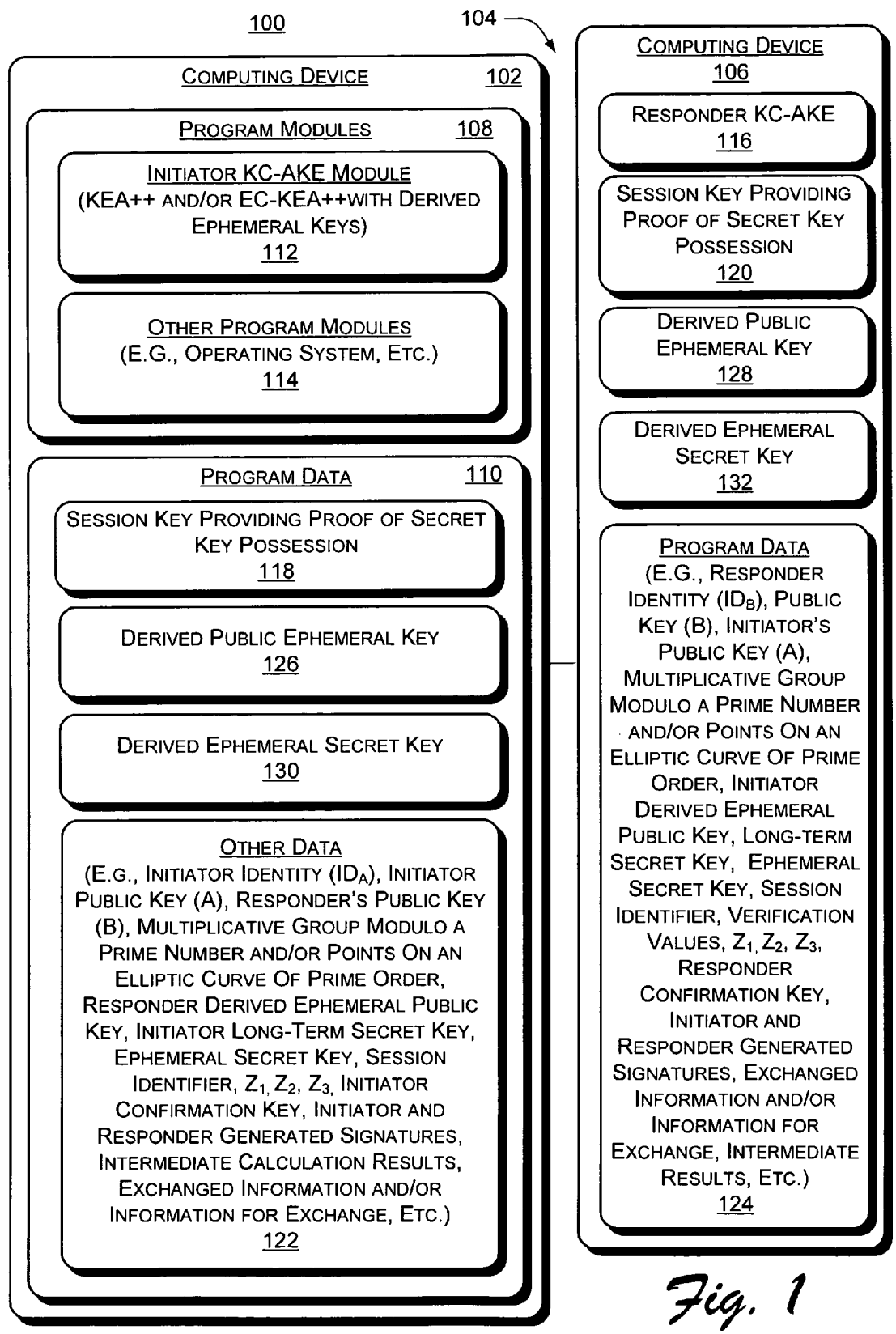
FIG. 1 shows an exemplary system for KC-AKE with derived ephemeral keys, according to one embodiment.
Figure 2:
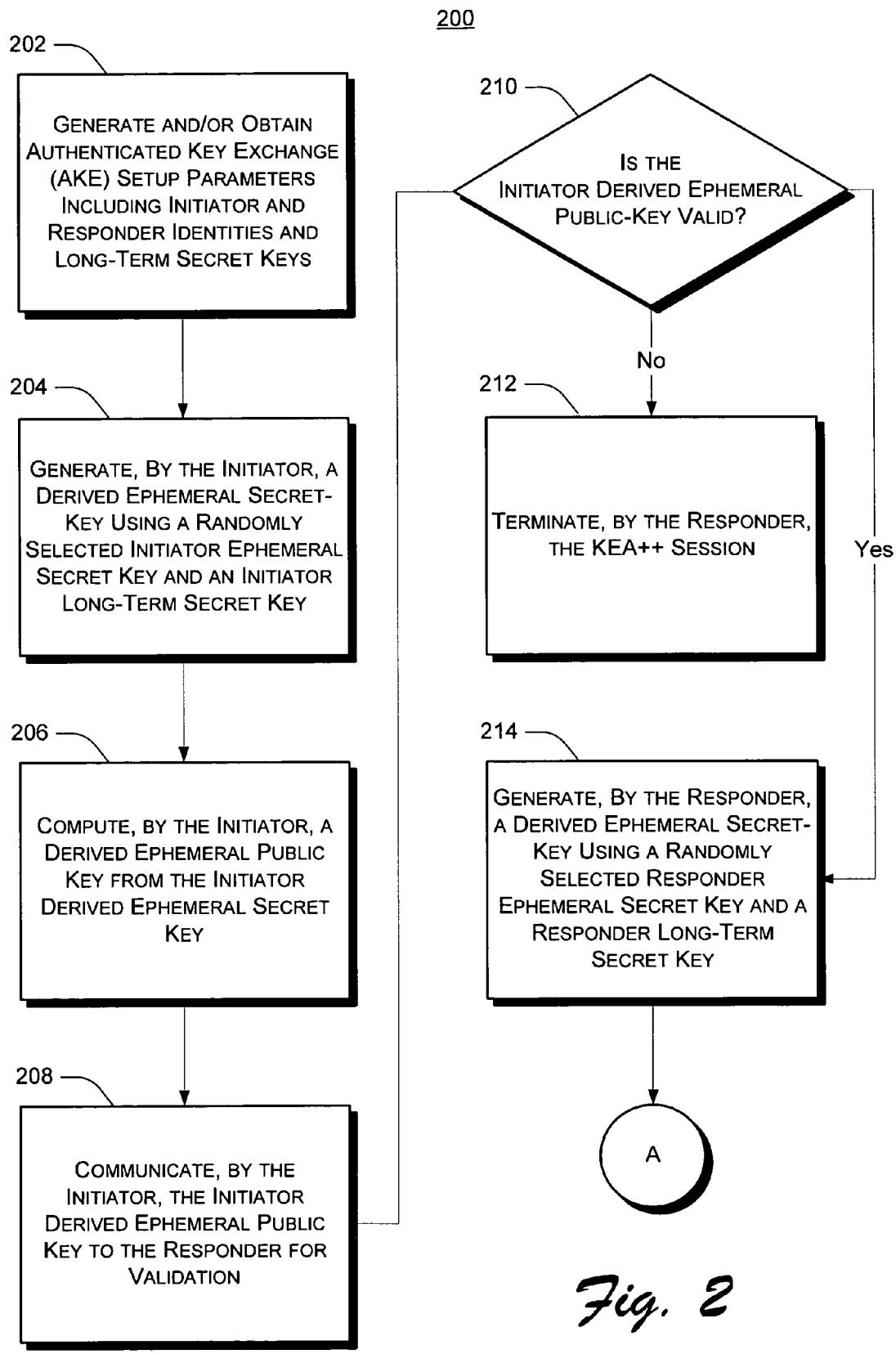
FIG. 2 shows an exemplary procedure for KC-AKE with derived ephemeral keys, according to one embodiment.

FIG. 1 shows an exemplary system 100 for KC-AKE with derived ephemeral keys. In this implementation, system 100 includes a general purpose computing device 102 coupled over network 104 to another general-purpose computing device 106. Computing devices 102 and 106 represent any type of computing device such as a personal computer, a laptop, a server, handheld or mobile computing device (e.g., a cellular phone, personal digital assistant), etc. Computing device 102 includes program modules 108 and program data 110 to implement initiator operations of KC-AKE with derived ephemeral keys. For example, program modules 108 include, for example, initiator KC-AKE module 112 and other program modules 114 such as an operating system, etc. Computing device 106 also includes program modules and program data to implement responder operations of KC-AKE with derived ephemeral keys. For example, computing device 106 includes responder KC-AKE module 116.

Both initiator and responder KC-AKE with derived ephemeral keys modules 112 and 116 respectively implement KEA++C and/or EC-KEA++C operations. KEA++C operations are directed to KC-AKE with derived ephemeral keys using a group of natural numbers modulo a fixed prime number to allow the two parties (i.e., an initiator and a responder) to determine an agreed secret session key (represented by session keys 118 and 120). Session key 118 represents a session key determined by the initiator, and session key 120 represents a session key determined by the responder (these keys will be equal—and agreed session key value—if the protocol is properly executed). EC-KEA++C operations are directed to KC-AKE with derived ephemeral keys using a group of points on an elliptic curve of prime order to determine an agreed secret session key based on initiator and responder identities, while authenticating identities of the parties. In KEA++C and EC-KEA++C, the agreed session key allows the parties to securely exchange information with one another over network 104 (e.g. a public channel).

KEA++C and EC-KEA++C protocols assume that the two parties have respective identities (initiator and responder identities) and public keys registered with a certificate of authority. Techniques to register identities and public keys with a certificate authority are well known. For purposes of exemplary illustration, initiator and responder identities ($ID_A$ and $ID_B$), as well as initiator and responder public keys (A and B), are shown as respective portions of data 122 and 124.

We now describe exemplary KEA++C operations with respect to TABLE 1. (Exemplary EC-KEA++C operations are described in greater detail below with respect to TABLE 2).

KEA++C binary strings to binary strings of a fixed length. Identities $ID_A$ and $ID_B$ are arbitrary binary strings comprising, for example, the names of the respective parties, addresses, and/or any other type of context information. MAC is an arbitrary standard cryptographic Message Authentication Code. MAC takes as input a binary string of a fixed length (called a key) and a binary string of an arbitrary length (called a message). The output of MAC is a binary string of a fixed length, called a tag or a signature of the message. A party sharing a secret MAC key can verify the signature of the message by re-computing the MAC and comparing original signature with the recomputed signature.

In one implementation, MAC is a function provided by respective ones of modules 112 and 116. In another implementation, MAC is a function respectively provided by other program modules of the initiator 102 and the responder 106.

As shown in TABLE 1, the initiator 102 utilizes long-term (static) secret key a; the responder 106 utilizes long-term secret key b. Each of the initiator and the responder maintains a respective public key registered with a certificate authority (not shown). For example, the initiator 102 uses public key $A=g^a$, and the responder 106 uses public key $B=g^b$. At this point, it is assumed that the initiator's and responder's public

TABLE 1

EXEMPLARY OPERATIONS FOR KEA++C

| Initiator | Responder |
|---|---|
| Identity: $ID_A$ | Identity: $ID_B$ |
| Secret key: a from [1 ... q−1] | Secret key: b from [1 ... q−1] |
| q prime factor of p−1 | Public key: $B = g^b$ mod p |
| Public key: $A = g^a$ mod p | Initiator's public key: A |
| Responder's public key: B | Session identifier: sid |
| Session identifier: sid | Assumption: Initiator's public key is valid |
| Assumption: Responder's public key is valid | |
| Pick x at random from [1 ... q−1] | |
| Compute c = H(x, a) | |
| Compute $X = g^c$ mod p | |
| Send X to the Responder | Receive X from Initiator |
| | Verify that $X^q = 1$ mod p; if "not", terminate |
| | Pick y at random from [1 ... q−1] |
| | Compute d = H(y, b) |
| | Compute $Y = g^d$ mod p |
| | Compute $Z_1 = A^d$ mod p |
| | Compute $Z_2 = X^b$ mod p |
| | Compute $L = H(0, Z_1, Z_2, ID_A, ID_B, sid)$ |
| | Compute $SIG_B = MAC_L(0)$ |
| Receive (Y, $SIG_B$) from the Responder | Send (Y, $SIG_B$) to Initiator |
| Verify that $Y^q = 1$ mod p; if not, terminate | |
| Compute $Z_1 = Y^a$ mod p | |
| Compute $Z_2 = B^c$ mod p | |
| Compute $L = H(0, Z_1, Z_2, ID_A, ID_B, sid)$ | |
| Verify that $SIG_B = MAC_L(0)$; | |
| if "not", terminate the protocol | |
| Compute $SIG_A = MAC_L(1)$ | |
| Send $SIG_A$ to the Responder | Receive $SIG_A$ from the Verifier |
| | Verify that $SIG_A = MAC_L(1)$; |
| | if "not", terminate the protocol |
| Compute a session key | Compute a session key |
| $K = H(1, Z_1, Z_2, ID_A, ID_B, sid)$ | $K = H(1, Z_1, Z_2, ID_A, ID_B, sid)$ |

Referring to TABLE 1, the first column represents initiator operations and properties that are associated with computer 102 ("initiator 102"), and the second column represents responder operations and properties associated with computer 106 ("responder 106"). The setup parameters for KEA++C are as follows. The value p is a fixed prime number. The parameter q is a fixed prime number that is a divisor of p−1. The value g is an element from [1 ... p−1], which has order q; the powers of g can be viewed as a subgroup of order q of the multiplicative group [1 ... p−1], H is an arbitrary standard cryptographic hash function used to map all possible keys are valid, meaning that they are elements from [1 ... p−1] which are of order q. This validity property can be checked by raising a public key to the power q to determine if the output is 1 modulo p. Each communicating party knows the other respective party's public key. That is, the initiator 102 has the responder's public key, and the responder 106 has the initiator's public key.

The session identifier sid should be different for each respective session between the initiator 102 and the responder 106. The value of the session identifier is arbitrary, being a function of the particular implementation utilized to generate the session identifier. Each of these setup parameters (e.g., p, q, g, H, MAC, $ID_A$, $ID_B$, a, b, A, B, and sid) is represented by respective portions of other data 122 and program data 124. Techniques to obtain and/or generate these setup parameters are well known.

KEA++C begins with the generation and exchange between the initiator 102 and responder 106 of respective derived ephemeral public keys X 126 and Y 128. To generate the initiator ephemeral public key X, the initiator 102 randomly selects an exponent x (the initiator's ephemeral secret key) from [1 . . . q–1]. The initiator 102 then computes a derived ephemeral secret key c 130 by hashing the ephemeral secret key x with secret key a. The initiator 102 then utilizes the derived ephemeral secret key c to generate the derived ephemeral public key X. More particularly, ephemeral public key X is computed by raising the generator of the group g to the power c modulo p. The initiator 102 sends the ephemeral public key X to the responder 106.

Responsive to receiving the initiator's ephemeral public key X, the responder 106 verifies that X is valid by raising X to the power of q to determine whether the result is the identity element of the group, which is 1 modulo p. If this validity check fails, the responder 106 terminates the KEA++C protocol. When the initiator ephemeral public key X is valid, the responder 106 calculates derived ephemeral public key Y 128 as follows. Responder 106 computes a derived ephemeral secret key d 132 by hashing the ephemeral secret key y with secret key b. Responder 106 then utilizes the derived ephemeral secret key d to generate derived ephemeral public key Y. More particularly, ephemeral public key Y is computed by raising the generator of the group g to the power d modulo p.

Before sending the responder's ephemeral public key Y to the initiator, the responder 106 first performs the following operations. The responder 106 computes a number $Z_1$ from the group by raising A (i.e., the long-term public key of the initiator) to the power of the responder's derived ephemeral secret key d, mod p. The responder 106 also computes $Z_2$, another number in the group, by raising the initiator's ephemeral public key X to the power of b (i.e., the long-term secret key of the responder 106), mod p. Next, the responder 106 generates secret confirmation key L by applying a hash function H to concatenated values 0, $Z_1$, $Z_2$, $ID_A$, $ID_B$, and sid. The responder's secret confirmation key L is used to verify that the parties (responder and initiator) have received the described communications to one another. Additionally, the secret confirmation key is based on the responder's static secret key. Thus, the confirmation key facilitates demonstration that the responder has the ability to compute an agreed session key value.

In one implementation, responder 106 generates secret confirmation key L by applying a hash function H to concatenated values 0, $Z_1$, $Z_2$, $ID_A$, and $ID_B$.

Responder 106 applies the message authentication code (MAC) under secret confirmation key L to a message (0) to generate a signature $SIG_B$. At this point, responder 106 sends the responder's derived ephemeral public key Y 120 and $SIG_B$ to the initiator 102.

Responsive to receiving Y 128 and $SIG_B$ from the responder 106, the initiator 102 determines whether the responder's ephemeral public key is valid. This is accomplished by raising Y to the power of q, mod p. If the responder's ephemeral public key is determined not be valid, the initiator 102 terminates the key exchange session. Otherwise, the initiator computes a number $Z_1$ from the group by raising Y (i.e., the derived ephemeral public key 128 of the responder) to the power of the initiator's long-term secret key a, mod p. The initiator 102 also computes $Z_2$, another number in the group, by raising the responder's public key B to the power of c (i.e., the derived ephemeral secret key 130 of the initiator 102), mod p. At this point, the initiator 102 generates a respective secret confirmation key L by applying a hash function H to concatenated values 0, $Z_1$, $Z_2$, $ID_A$, $ID_B$, and sid. The responder's secret confirmation key L is used to verify that the parties (responder and initiator) have received the described communications to one another, as well as to demonstrate that the party has the ability to compute an agreed session key value.

In one implementation, the responder 106 generates secret confirmation key L by applying a hash function H to concatenated values 0, $Z_1$, $Z_2$, $ID_A$, and $ID_B$.

The initiator 102 then applies the message authentication code (MAC) under the initiator's secret confirmation key L to a message (0), the same message used by responder 102 to compute $SIG_B$, to determine whether the resulting signature is equal to signature $SIG_B$ (received from the responder 106). If the above check fails, the initiator 102 cannot be assured that the responder 106 can generate an agreed session key value (session key 120). In such a scenario, the initiator 102 terminates the key exchange session.

Otherwise, if the result of applying MAC under secret confirmation key L to a message (sid, $ID_B$, $ID_A$, Y, and X) does result in signature $SIG_B$, the initiator 102 computes a signature $SIG_A$ by applying the message authentication code MAC under secret confirmation key L to a message (1); note that the value of the message is different from the message value used by the responder 106 when computing $SIG_B$. The initiator 102 sends a signature $SIG_A$ to the responder 106. The initiator 102 computes a session key K (session key 118) by hashing the concatenation of the following values: 1, $Z_1$, $Z_2$, $ID_A$, $ID_B$, and sid.

In one implementation, initiator 102 determines the session key 118 by hashing only a subset of the above-indicated five values, for example only 1, $Z_1$, $Z_2$, $ID_A$ and $ID_B$.

Responsive to receiving $SIG_A$ from the initiator 102, the responder 106 determines whether $SIG_A$ is valid. This is accomplished by applying the message authentication code (MAC) under secret confirmation key L to a message (1) to determine whether the resulting signature is equal to signature $SIG_A$. If the result of this operation does not result in signature $SIG_A$, the responder 106 cannot be assured that the initiator 102 can generate an agreed session key value (session key 118). In such a scenario, the responder 106 terminates the key exchange session.

Otherwise, the responder computes a session key K (session key 120) by hashing the concatenation of the following values: 1, $Z_1$, $Z_2$, $ID_A$, $ID_B$, and sid (please note that in this scenario, $Z_1$ and $Z_2$ are values computed by the responder 106). In one implementation, responder 106 determines the session key 120 by hashing only a subset of the above-indicated five values, for example only 1, $Z_1$, $Z_2$, $ID_A$ and $ID_B$.

At this point, the initiator 102 and the responder 106, having successfully generated an agreed session key (i.e., respective session keys 118 and 120, which should be equal provided that both parties properly execute the protocol), and can exchange information securely using the generated session keys.

In view of the above, and in contrast to conventional key exchange scenarios, system 100 implements three rounds of communication between parties to verify that each of the respective parties demonstrated that it can compute a respective session key 118 or 120. This confirmation process is performed by the respective parties before any information is exchanged using an agreed session key. For purposes of exemplary illustration, respective portions of data 122 and 124 represent securely exchanged information and/or information for secure exchange.

KEA++C with Protection Against Revelation of Long-Term Secret Keys

In one embodiment, referring to TABLE 1 where one or both parties implementing KEA++C have validated the other party's derived ephemeral public key (X or Y), a party generates a respective session key (e.g., session key 118 or 120) such that for the respective session key to be valid, each party has to have knowledge of its own ephemeral secret key. This is an additional key confirmation feature that requires each party to send the other party proof of its ability to actually compute a respective session key. To this end, the party computes an additional value $Z_3$ (i.e., a "derived ephemeral Diffie-Hellman value) based on the other party's derived ephemeral public key (126 or 128) and the party's own derived ephemeral secret key (130 or 132). This additional value is hashed along with $Z_1$, $Z_2$, $ID_A$, $ID_B$, and sid to compute the respective confirmation key L. As described above, each party uses a computed confirmation key to verify the other party's signature. This additional value ($Z_3$) is also used to compute the agreed session key (i.e., session keys 118 and 120). That is in the session key is computed based on $Z_1$, $Z_2$, $Z_3$, $ID_A$, $ID_B$, and sid. For example, the initiator 102 calculates $Z_3 = I^c$ mod p, which is then used to generate session key 118. The responder 106 calculates $Z_3 = X^d$ mod p, which is then used to generate session key 120.

EC-KEA++C

In reference to TABLE 2, we now describe exemplary operations for EC-KEA++C, which is elliptic curve-based KC-AKE with derived ephemeral keys protocol.

responder operations and properties associated with computer 106 (i.e., responder 106). The setup parameters for EC-KEA++C, which is elliptic curve-based extended authenticated key encryption protocol, are as follows. G is a group of points on an elliptic curve E of prime order. The elliptic curve is specified by an equation of the form $y^2 = x^3 + ax + b$. The group of points on the elliptic curve consists of ordered pairs (x, y) that satisfy this elliptic curve equation, and the identity element, which is a point at infinity.

The setup parameter q is a prime number, which represents the order, or size, of the group G. The value P is an element from G, which has order q, and H is an arbitrary cryptographic hash function. MAC is an arbitrary standard cryptographic Message Authentication Code. MAC takes as input a binary string of a fixed length (called a key) and a binary string of an arbitrary length (called a message). The output of MAC is a binary string of a fixed length, called a tag or a signature of the message. A party with a secret confirmation key can verify the signature of the message by re-computing the MAC and comparing original signature with the recomputed signature.

As shown in TABLE 2, each party (the initiator 102 and the responder 106) has its own long-term secret key (a or b), which is a number from [1 . . . q−1]. Each of the initiator and the responder maintains a respective public key registered with a certificate authority (not shown). For example, the initiator 102 uses public key A=aP, and the responder 106 uses public key B=bP. At this point, EC-KEA++C assumes that the initiator's and responder's public keys are valid points on a specified elliptic curve. Additionally, each communicating party knows the other respective party's public key. That is, the initiator 102 has the responder's public key B, and the responder 106 has the initiator's public key A.

TABLE 2

EXEMPLARY OPERATIONS FOR EC-KEA++C

| Initiator | Responder |
|---|---|
| Identity: $ID_A$ | Identity: $ID_B$ |
| Secret key: a from [1 . . . q−1] | Secret key: b from [1 . . . q−1] |
| Public key: A = aP | Public key: B = bP |
| Responder's public key: B | Initiator's public key: A |
| Session identifier: sid | Session identifier: sid |
| Assumption: Responder's public key is valid | Assumption: Initiator's public key is valid |
| Pick x at random from [1 . . . q−1] | |
| Compute c = H(x, a) | |
| Compute X = cP | |
| Send X to the Responder | Receive X from Initiator |
| | Verify that X is in G; if "not", terminate |
| | Pick y at random from [1 . . . q−1] |
| | Compute d = H(y, b) |
| | Compute Y = dP |
| | Compute $Z_1$ = dA |
| | Compute $Z_2$ = bX |
| | Compute L = H(0, $Z_1$, $Z_2$, $ID_A$, $ID_B$, sid) |
| Receive (Y, $SIG_B$) from the Responder | Compute $SIG_B$ = $MAC_L$(0) |
| Verify that Y is in G; if not, terminate | Send (Y, $SIG_B$) to Initiator |
| Compute $Z_1$ = aY | |
| Compute $Z_2$ = cB | |
| Compute L = H(0, $Z_1$, $Z_2$, $ID_A$, $ID_B$, sid) | |
| Verify that $SIG_B$ = $MAC_L$(0); | |
| if "not", terminate | |
| Compute $SIG_A$ = $MAC_L$(1) | |
| Send $SIG_A$ to the Responder | Receive $SIG_A$ from the Verifier |
| | Verify that $SIG_A$ = $MAC_L$(1); |
| Compute a session key | if "not", terminate |
| K = H(1, $Z_1$, $Z_2$, $ID_A$, $ID_B$, sid) | Compute a session key |
| | K = H(1, $Z_1$, $Z_2$, $ID_A$, $ID_B$, sid) |

Referring to TABLE 2, the first column represents initiation operations and properties associated with computer 102 (i.e., "initiator 102"), and the second column represents The session identifier sid should be different for each respective session between the initiator 102 and the responder 106. The value of the session identifier is arbitrary, being a function of the particular implementation utilized to generate the session identifier. Each of these setup parameters (e.g., p, q, g, H, MAC, $ID_A$, $ID_B$, a, b, A, B, and sid) is represented by respective portions of other data 122. Techniques to obtain and/or generate these setup parameters are well known.

As shown in TABLE 2, EC-KEA++C implements the operations described above with respect to TABLE 1 with scalar multiplication in an elliptic curve group (i.e., the group operation is addition of points). This is in contrast to KEA++C, which implements exponentiation operations using a multiplicative group of a prime field.

EC-KEA++C with Protection Against Revelation of Long-Term Secret Keys

In one embodiment, referring to TABLE 2 where one or both parties implementing EC-KEA++C have validated the other party's derived ephemeral public key (X or Y), a party generates a respective session key (e.g., session key 118 or 120) such that for the respective session key to be valid, each party has to have knowledge of its own ephemeral secret key. To this end, the party computes an additional value $Z_3$ (i.e., a "derived ephemeral Diffie-Hellman value) based on the other party's derived ephemeral public key (126 or 128) and the party's own derived ephemeral secret key (130 or 132). This additional value is hashed along with $Z_1$, $Z_2$, $ID_A$, $ID_B$, and sid to compute the respective session key. That is in the session key is computed based on $Z_1$, $Z_2$, $Z_3$, $ID_A$, $ID_B$, and sid. For example, the initiator 102 calculates $Z_3$=cY, which is then used to generate session key 118. The responder 106 calculates $Z_3$=dX, which is then used to generate session key 120. By generating the session keys in this manner, each party demonstrates ability to compute an agreed session key value.

Exemplary Procedure

FIGS. 2 through 6 show operations of an exemplary procedure 200 for KC-AKE with derived ephemeral keys. For purposes of discussion and exemplary illustration, operations of this procedure are described with respect to components of FIG. 1. The left-most digit of a component reference number identifies the particular figure in which the component first appears. Various changes and modifications may become apparent to those skilled in the art from the present description, including changes and modifications to the order of operations of procedure 200. In this implementation, system 100 of FIG. 1 implements operations of procedure 200.

At block 202, AKE program modules 112 (FIG. 1) and 116, which are respectively associated with an initiator and a responder, generate or otherwise obtain setup parameters to implement AKE with derived ephemeral keys. The setup parameters associated with KEA++C operations are for using a group of natural numbers modulo a fixed prime number. The setup parameters associated with EC-KEA++C operations are for operations using a group of points on elliptic curve of prime order. In both scenarios, the setup parameters include the initiator and responder identities and respective long-term secret keys.

At block 204, the initiator 102 generates a derived ephemeral secret key 130 ("initiator derived ephemeral secret key"). In one implementation, this is accomplished by generating a randomly selected ephemeral secret key. The randomly selected ephemeral secret key is hashed along with the initiator's long-term secret key to produce the derived initiator ephemeral secret key. At block 206, the initiator computes a derived ephemeral public key 126 ("initiator derived ephemeral public key"). In one implementation, this is accomplished as a function of the derived initiator ephemeral secret key and a group of numbers (i.e., KEA++) or a group of points (i.e., EC-KEA++). At block 208, the initiator 102 communicates the initiator derived ephemeral public key to the responder for validation.

At block 210, the responder 106 determines whether the received initiator derived ephemeral public key 126 is valid. If not, at block 212, the responder 106 terminates the AKE session with the initiator. Otherwise, if the received initiator derived ephemeral public key is valid, operations continue at block 214. At block 214, the responder generates a derived ephemeral public key 128 ("responder derived ephemeral public key"). In one implementation, this is accomplished by hashing a randomly selected responder ephemeral secret key and the responder's long-term secret key (e.g., see TABLE 1, b). At this point, the operations of procedure 200 continue on FIG. 3, on page reference "A."

Figure 3:
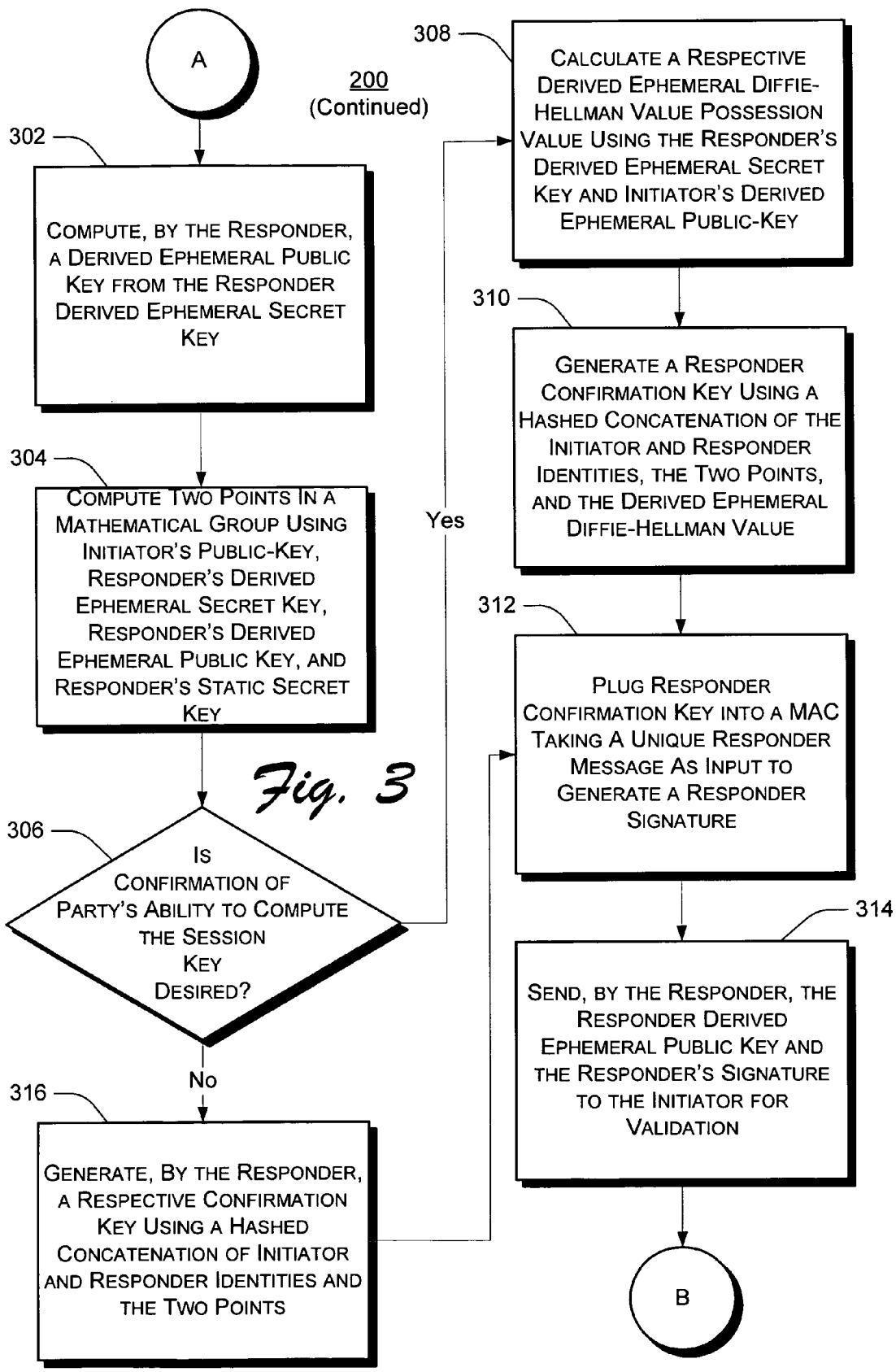
FIG. 3 shows an exemplary procedure for KC-AKE with derived ephemeral keys, according to one embodiment. More particularly.

FIG. 3 shows an exemplary procedure for key confirmation authenticated key exchange with derived ephemeral keys, according to one embodiment. More particularly, the operations shown in FIG. 3 are continuations of the procedure 200 of FIG. 2. Referring to FIG. 3, at block 302, the responder 106 (FIG. 1) computes a derived ephemeral public key 128 ("responder derived ephemeral public key"). This computation is based on the responder derived ephemeral secret key determined above in block 214 of FIG. 2.

At block 304, the responder 106 computes at least two points ($Z_1$ and $Z_2$) in a mathematical group. In this implementation, $Z_1$ is computed based at least on the initiator's public-key (A) and the responder's derived ephemeral secret key 132 (d). In KEA++C, $Z_1$=$A^d$ mod p. In EC-KEA++C, $Z_1$=dA. In this implementation, $Z_2$ is computed based at least on the responder's long-term secret key (b) and the initiators ephemeral public key (X). In KEA++C, $Z_2$=$X^b$ mod p. In EC-KEA++C, $Z_2$=bX.

At block 306, responder 106 determines whether confirmation of a party's ability to compute the session key is desired. If so, at block 308, the responder calculates a respective derived ephemeral Diffie-Hellman value based on responders' derived ephemeral secret key (i.e., key 132) and initiator's' derived ephemeral public key (i.e., key 126). The operations of block 308 implement a Diffie-Hellman key agreement with the two derived ephemeral secret keys to generate the respective derived ephemeral Diffie-Hellman values (e.g., see values $Z_3$ in the sections titled "KEA++C with Protection against Revelation of Long-Term Secret Keys" and "EC-KEA++C with Protection against Revelation of Long-Term Secret Keys"). At block 310, the responder computes a responder confirmation key L based on a hashed concatenation of the initiator and responder identities (i.e., $ID_A$ and $ID_B$), the two points $Z_1$ and $Z_2$ calculated above at block 304, and the derived ephemeral Diffie-Hellman value $Z_3$ calculated above at block 308.

At block 312, the responder plugs the responder confirmation key L into a MAC taking a unique responder message as input to generate a responder signature $SIG_B$. In this implementation, the unique responder message is "0." At block 314, the responder sends the responder derived ephemeral public key (key 128) and the responder's signature $SIG_B$ to the initiator 102 for validation/confirmation. At this point, procedure 200 continues in FIG. 4 at on page reference "B."

If confirmation of the party's ability to compute the session key was not desired at block 306, operations continue at block 316. At block 316, the responder 106 generates a respective confirmation key L based on a hashed concatenation of initiator and responder identities ($ID_A$ and $ID_B$) with the two points $Z_1$ and $Z_2$ calculated above at block 304. At this point, the operations of procedure 200 continue at block 312 as described above.

Figure 4:
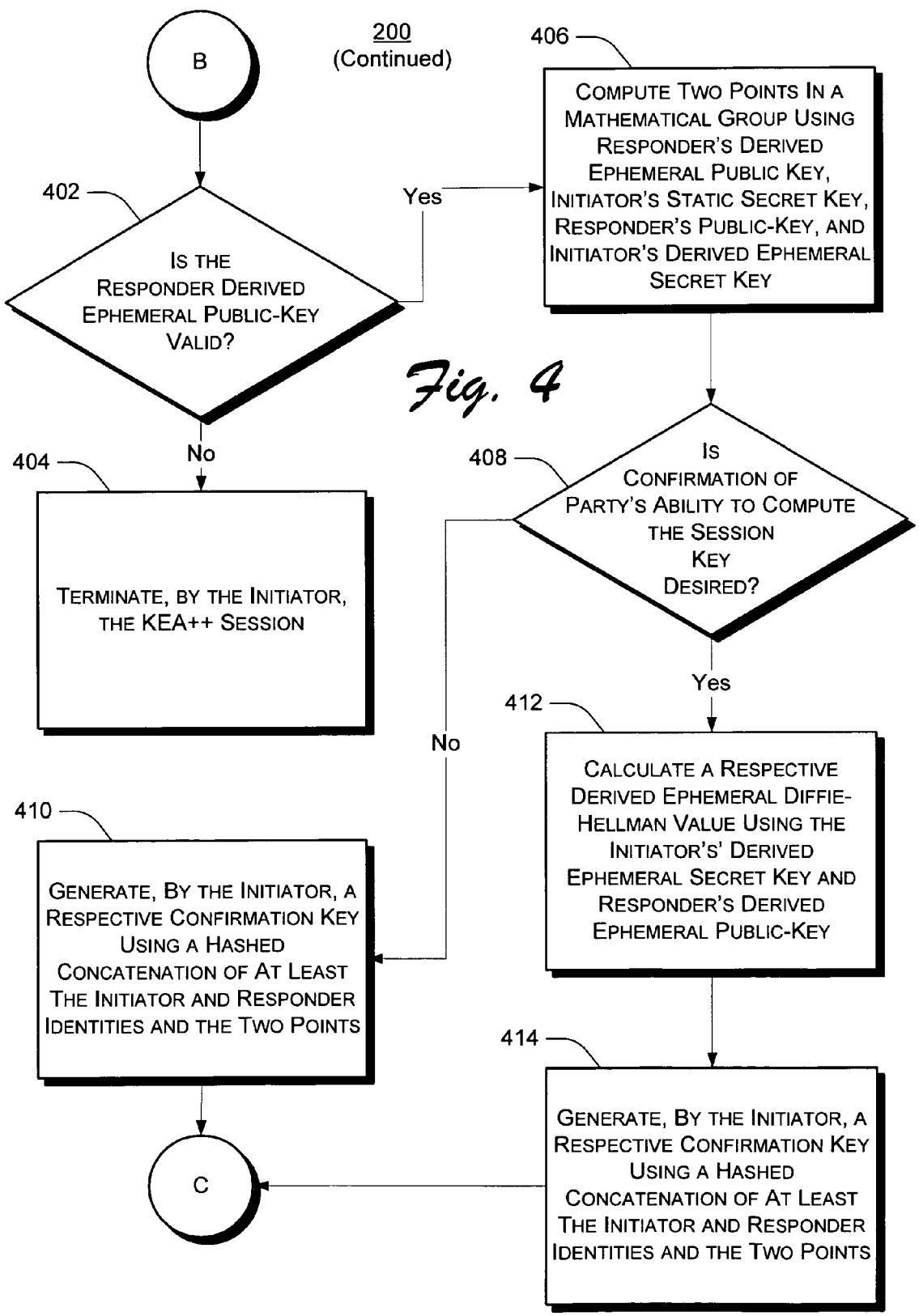
FIG. 4 shows an exemplary procedure for KC-AKE with derived ephemeral keys, according to one embodiment. More particularly.

FIG. 4 shows an exemplary procedure for key confirmed authenticated key exchange with derived ephemeral keys, according to one embodiment. The operations of FIG. 4 are a continuation of the exemplary operations of FIGS. 2 and 3. At block 402, initiator 102 determines whether the received responder derived ephemeral public key 128 (FIG. 1) is valid. If the responder derived ephemeral public key is determined not to be valid, operations continue at block 404, where the initiator 102 terminates the KC-AKE with derived ephemeral keys protocol session. If the responder ephemeral public key is valid, operations continue at block 406.

At block 406, the initiator 102 computes to points ($Z_1$ and $Z_2$) in a mathematical group. In this implementation, the initiator computes $Z_1$ based at least on the responder's derived ephemeral public key (y) 120 and the initiators long-term secret key (a). In KEA++C, the initiator computes $Z_1 = Y^a$ mod p. In EC-KEA++C, the initiator computes $Z_1 = aY$. In this implementation, the initiator computes $Z_2$ based at least on the responder's public-key (B) and the initiators derived ephemeral secret key (c) 130. That is, in KEA++C the initiator computes $Z_2 = B^c$ mod p. Whereas, in EC-KEA++C the initiator computes $Z_2 = cB$.

At block 408, initiator 102 determines whether confirmation of a party's ability to compute the session key is desired. If not, operations continue at block 410, wherein initiator 102 generates a respective confirmation key L based on a hashed concatenation of initiator and responder identities ($ID_A$ and $ID_B$) with the two points $Z_1$ and $Z_2$ calculated at block 406. At this point, the operations of procedure 200 continue in FIG. 5 at on page reference "C."

Referring to FIG. 4, if confirmation of a party's ability to compute the session key is desired at block 408, operations continue at block 412. At block 412, the initiator 102 calculates a respective derived ephemeral Diffie-Hellman value ($Z_3$) based on initiator derived ephemeral secret key 130 and responder derived ephemeral public key 128. The operations of block 412 implement a Diffie-Hellman key agreement with the two derived ephemeral secret keys to generate the respective derived ephemeral Diffie-Hellman values (e.g., see values $Z_3$ in the sections titled "KEA++C with Protection against Revelation of Long-Term Secret Keys" and "EC-KEA++C with Protection against Revelation of Long-Term Secret Keys").

At block 414, the initiator 102 computes initiator confirmation key L based on a hashed concatenation of the initiator and responder identities (i.e., $ID_A$ and $ID_B$), the two points $Z_1$ and $Z_2$ calculated above at block 406, and the derived ephemeral Diffie-Hellman value $Z_3$ calculated above at block 412. Note that the confirmation key value of block 414 includes the derived ephemeral Diffie-Hellman value, whereas the confirmation key value calculated with respect to block 410 is not based on the derived ephemeral Diffie-Hellman value. The operations of procedure 200 continue in FIG. 5 at on page reference "C."

Figure 5:
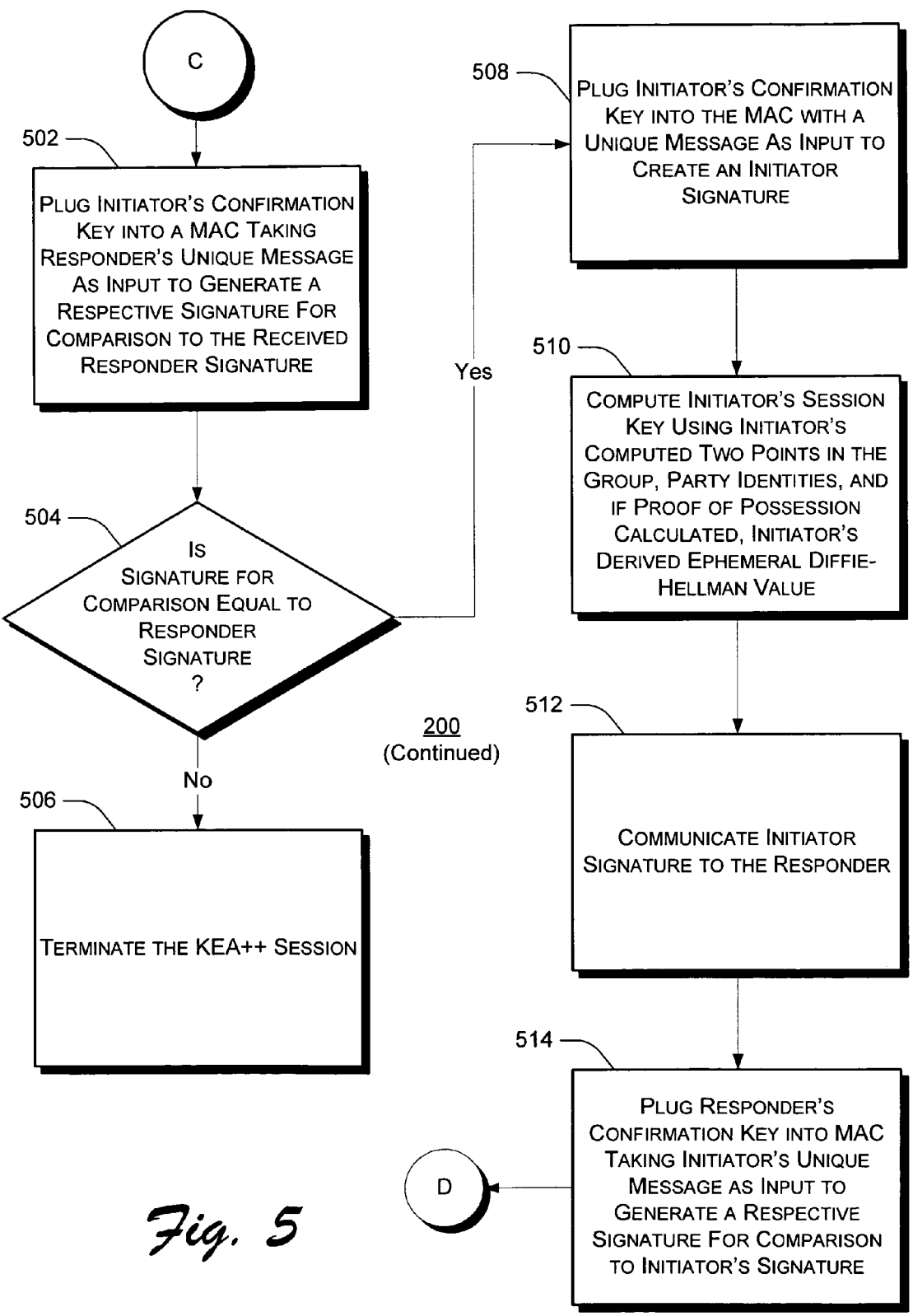
FIG. 5 shows an exemplary procedure for KC-AKE with derived ephemeral keys, according to one embodiment. More particularly.

FIG. 5 shows an exemplary procedure for key confirmed authenticated key exchange with derived ephemeral keys, according to one embodiment. The operations of FIG. 5 are a continuation of the exemplary operations of FIGS. 2, 3, and 4. At block 502, the initiator 102 plugs the initiator confirmation key L into a MAC taking the unique responder message (e.g., "0") as input to generate a respective signature for comparison to the received responder signature $SIG_B$. At block 504, the initiator 102 determines whether the signature for comparison is equal to the responder signature $SIG_B$. This comparison performs key confirmation. More particularly, the initiator 102 determines whether the responder 106 has actually calculated the necessary values to generate a respective session key for use to exchange information securely with the initiator 102.

If the signature for comparison is not equal to the signature $SIG_B$ received from the responder 106, the initiator 102, at block 506, terminates the KC-AKE with derived ephemeral keys protocol session. If the signature for comparison was equal to the responder signature at block 504, the operations continue at block 508. At block 508, the initiator 102 plugs the initiator confirmation key L into the MAC to generate a respective initiator signature $SIG_A$. The MAC takes a unique MAC message value (e.g., 1) as input. At block 510, the initiator 102 computes a respective session key (i.e., session key 118). The respective session key is computed using the initiator-calculated points in the group (block 406 of FIG. 4), the initiator and responder identities, and if a respective derived ephemeral Diffie-Hellman value was calculated (block 412 of FIG. 4), the initiator's derived ephemeral Diffie-Hellman value. In FIG. 5, the operations of block 510 are shown as immediately following the operations of block 508. However, in another implementation, the operations of block 510 follow the operations of block 512, which are now described.

At block 512, the initiator 102 communicates the initiator signature $SIG_A$ to the responder 106. This operation is performed to demonstrate to the responder 106 that the initiator 102 can compute a respective session key (session key 118). At block 514, responsive to receiving the initiator signature, the responder 106 computes a respective signature for comparison to the initiator signature. More particularly, the responder 106 computes the signature for comparison by plugging the responder computed confirmation key L into the MAC. The MAC, in this scenario, takes the initiator's unique message as input. In this implementation, the initiator's unique message is "1." The MAC generates the signature for comparison to the initiator signature. At this point, the procedure 200 continues at FIG. 6, on page reference "D."

Figure 6:
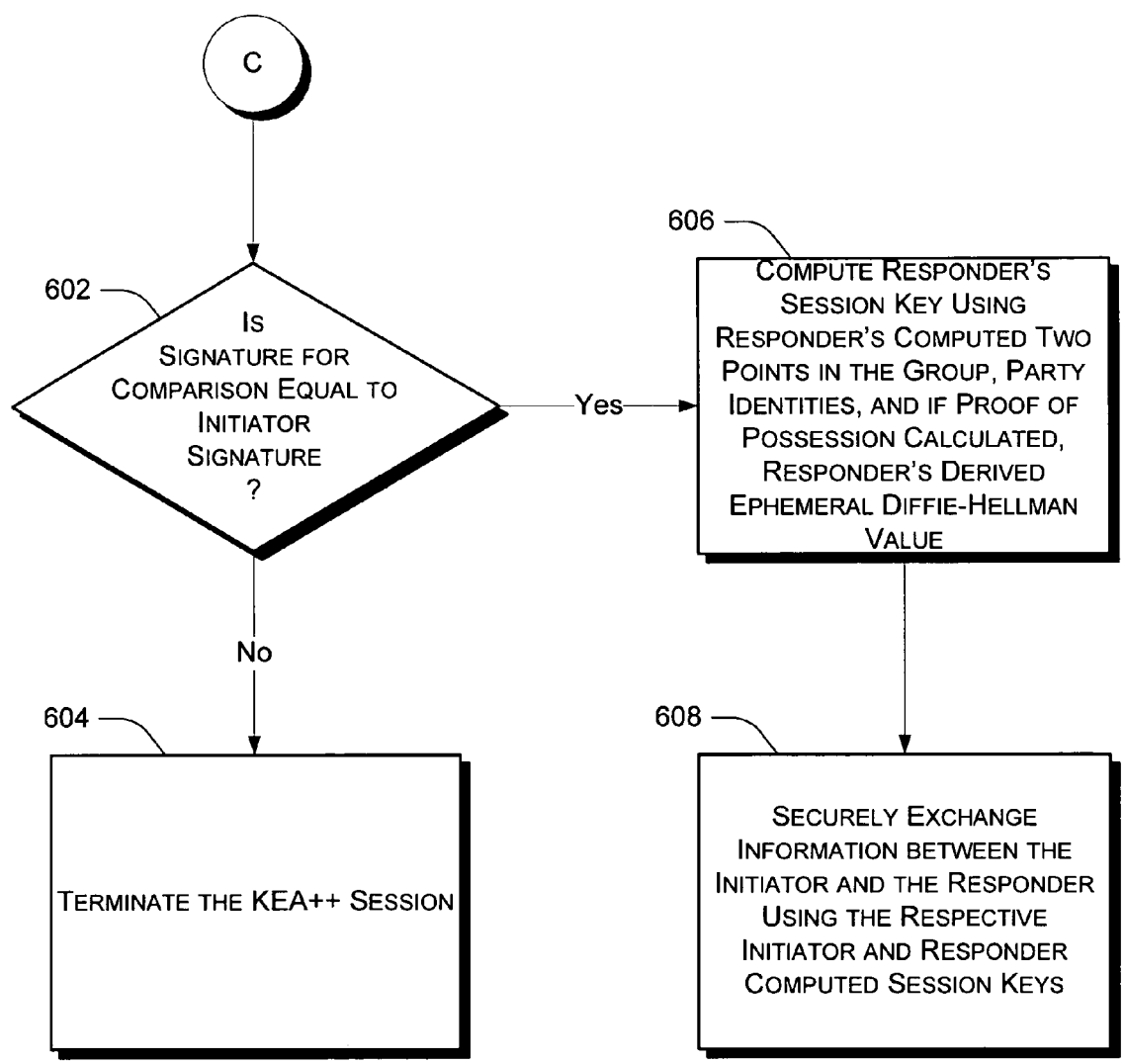
FIG. 6 shows an exemplary procedure for KC-AKE with derived ephemeral keys, according to one embodiment. More particularly.

Referring to FIG. 6, at block 602 the responder 106 determines whether the computed signature for comparison (see the operations of block 514 of FIG. 5) is equal to the signature $SIG_A$ received from the initiator 102. If the computed signature for comparison is not equal to the initiator's signature, the responder 106 terminates the KC-AKE with derived ephemeral keys protocol session at block 604. The session is terminated because the responder 106 is not assured that the initiator 102 can compute a valid session key for use to exchange information securely with the responder 106. However, if the signature for comparison is equal to the initiator's signature, the operations of procedure 200 continue at block 606.

At block 606, the responder 106 computes a respective session key (session key 120). In this implementation, the respective session key is computed using responder-calculated points in the group ($Z_1$ and $Z_2$), the party identities ($ID_A$ and $ID_B$), and if a respective derived ephemeral Diffie-Hellman value was calculated (block 308 of FIG. 3), the responder's derived ephemeral Diffie-Hellman value ($Z^3$). At block 608, the initiator 102 and the responder 106 exchange information securely using the agreed session key value represented by session keys 118 and 120.

An Exemplary Operating Environment

FIG. 7 illustrates an example of a suitable computing environment in which KC-AKE with derived ephemeral keys may be fully or partially implemented. Exemplary computing environment 700 is only one example of a suitable computing environment for the exemplary system 100 of FIG. 1 and exemplary operations of FIGS. 2 through 6 and is not intended to suggest any limitation as to the scope of use or functionality of systems and methods the described herein. Neither should computing environment 700 be interpreted as having any dependency or requirement relating to any one or combination of components illustrated in computing environment 700.

The methods and systems described herein are operational with numerous other general purpose or special purpose computing system, environments or configurations. Examples of well-known computing systems, environments, and/or configurations that may be suitable for use include, but are not limited to personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a networked computing environment where tasks are performed by remote processing devices that are linked through a communications network.

With reference to FIG. 7, an exemplary system providing KC-AKE with derived ephemeral keys includes a general-purpose computing device in the form of a computer 710 implementing, for example, initiator operations associated with computing device 102 of FIG. 1. Components of computer 710 may include, but are not limited to, processing unit(s) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 710 typically includes a variety of computer-readable media. Computer-readable media can be any available media that can be accessed by computer 710, including both volatile and nonvolatile media, removable and non-removable media. By way of example, and not limitation, computer-readable media may comprise computer storage media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710.

System memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that they are at least different copies.

A user may enter commands and information into the computer 710 through input devices such as a keyboard 762 and pointing device 761, commonly referred to as a mouse, trackball or touch pad. Other input devices (not shown) may include a microphone, joystick, graphics pen and pad, satellite dish, scanner, etc. These and other input devices are often connected to the processing unit 720 through a user input interface 760 that is coupled to the system bus 721, but may be connected by other interface and bus structures, such as a parallel port, game port or a universal serial bus (USB). In this implementation, a monitor 791 or other type of user interface device is also connected to the system bus 721 via an interface, for example, such as a video interface 790.

The computer 710 operates in a networked environment using logical connections to one or more remote computers, such as a remote computer 780. In one implementation, remote computer 780 represents computing device 106 of a responder, as shown in FIG. 1. The remote computer 780 may be a personal computer, a server, a router, a network PC, a peer device or other common network node, and as a function of its particular implementation, may include many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example and not limitation, FIG. 7 illustrates remote application programs 785 as residing on memory device 781. The network connections shown are exemplary and other means of establishing a communications link between the computers may be used.

CONCLUSION

Although the above sections describe KC-AKE with derived ephemeral keys in language specific to structural features and/or methodological operations or actions, the implementations defined in the appended claims are not necessarily limited to the specific features or actions described. Rather, the specific features and operations of system 100 (FIG. 1) and procedure 200 (FIGS. 2 through 6) are disclosed as exemplary forms of implementing the claimed subject matter.

The invention claimed is:

1. A computer-implemented method for key confirmed (KC) authenticated key exchange (AKE) with derived ephemeral keys protocol using a mathematical group, the method comprising:
  generating, by a first party being a computing system configured for KC-AKE with derived ephemeral keys protocol using a mathematical group, a first-party derived ephemeral public key;
  sending to a second party, by the first party, the first-party derived ephemeral public key for validation;
  receiving from the second party, by the first party, a second-party derived ephemeral public key and a second-party signature;
  responsive to receiving the second-party derived ephemeral public key and the second-party signature, verifying, by the first party, that the second-party derived ephemeral public key is valid;
  if the second-party derived ephemeral public key is not valid, terminating, by the first party, the KC-AKE with derived ephemeral keys protocol;
  if the second-party derived ephemeral public key is valid, then:
    generating, by the first party, a secret confirmation key, the secret confirmation key facilitating demonstration that the first party has the ability to compute an agreed session key value;
    generating, by the first party, a validation second-party signature using the secret confirmation key value and a first-party message input into a message authentication code (MAC) function, the secret key confirmation value being based on registered identities of the first and second parties, a session identifier and elements of the mathematical group, the elements being based on the second-party derived ephemeral public key, a long-term secret key of the first party, a second party public key, and a derived ephemeral secret key of the first party;
    verifying, by the first party, that the validation second-party signature matches the received second-party signature;
    if the validation second-party signature does not match the received second-party signature, terminating, by the first party, the KC-AKE with derived ephemeral keys protocol;
    if the validation second-party signature matches the received second-party signature, then:
      generating, by the first party, a first-party signature using the secret confirmation key value and a second-party message input into the MAC function;
      sending to the second party, by the first party, the first-party signature; and
      generating, by the first party, a session key, the session key being based on registered identities of the first and second parties, the session identifier, and elements of the mathematical group.

2. The method of claim 1, wherein the mathematical group is a subgroup of a multiplicative group of natural numbers modulo a prime number, and wherein operations associated with confirming comprise modular exponentiation.

3. The method of claim 1, wherein the mathematical group is a subgroup of the group of points on an elliptic curve, and wherein operations associated with the confirming comprise scalar multiplication in elliptic curve groups.

4. The method of claim 1, wherein the first and second parties are respectively an initiator and a responder, or wherein the first and second parties are respectively a responder and an initiator.

5. The method of claim 1, wherein operations associated with the generating and verifying comprise three (3) passes of communication between the first and second parties.

6. The method of claim 1, wherein the first party determines the session key by applying a hash function to a subset of the registered identities of the first and second parties and elements of the mathematical group.

7. A computer-implemented method for key confirmed (KC) authenticated key exchange (AKE) with derived ephemeral keys protocol using a mathematical group, the method comprising:
  receiving, by a second party being a computing system configured for KC-AKE with derived ephemeral keys protocol using a mathematical group, a first-party derived ephemeral public key for validation, from a first party;
  responsive to receiving the first-party derived ephemeral public key, verifying, by the second party, that the first-party derived ephemeral public key is valid;
  if the first-party derived ephemeral public key is not valid, terminating, by the second party, the KC-AKE with derived ephemeral keys protocol;
  if the first-party derived ephemeral public key is valid, then:
    generating, by the second party, a second-party derived ephemeral public key;
    generating, by the second party, a secret confirmation key, the secret confirmation key facilitating demonstration that the second party has the ability to compute an agreed session key value;
    generating, by the second party, a second-party signature using the secret confirmation key value and a first-party message input into a message authentication code (MAC) function, the secret key confirmation value being based on registered identities of the first and second parties, a session identifier and elements of the mathematical group, the elements being based on a long-term public key of the first party, a derived ephemeral secret key of second party, the first-party derived ephemeral public key, and a long term secret key of the second party;

sending, by the second party, the second-party derived ephemeral public key and the second-party signature to the first party;

receiving, by the second party, the first-party signature;

responsive to receiving the first-party signature, generating, by the second party, a validation first-party signature using the secret confirmation key and a second-party message input into the MAC function;

verifying, by the second party, that the validation first-party signature matches the received first-party signature;

if the validation first-party signature does not match the received first-party signature, terminating, by the second party, the KC-AKE with derived ephemeral keys protocol;

if the validation first-party signature matches the received first-party signature, generating, by the second party, a session key, the session key being based on registered identities of the first and second parties, the session identifier, and elements of the mathematical group.

8. The method of claim 7, wherein the mathematical group is a subgroup of a multiplicative group of natural numbers modulo a prime number, and wherein operations associated with confirming comprise modular exponentiation.

9. The method of claim 7, wherein the mathematical group is a subgroup of the group of points on an elliptic curve, and wherein operations associated with the confirming comprise scalar multiplication in elliptic curve groups.

10. The method of claim 7, wherein the first and second parties are respectively an initiator and a responder, or wherein the first and second parties are respectively a responder and an initiator.

11. The method of claim 7, wherein operations associated with the generating and verifying comprise three passes of communication between the first and second parties.

12. The method of claim 7, wherein the second party generates the secret confirmation key by applying a hash function to the registered identities of the first and second parties and elements of the mathematical group.

13. The method of claim 7, wherein the second party generates the session key by applying a hash function to a subset of the registered identities of the first and second parties and elements of the mathematical group.

* * * * *